US009148895B2

(12) United States Patent
PalChaudhuri et al.

(10) Patent No.: US 9,148,895 B2
(45) Date of Patent: Sep. 29, 2015

(54) BRIDGE MODE FIREWALL MOBILITY

(75) Inventors: Santashil PalChaudhuri, West Bengal (IN); Pradeep Iyer, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 224 days.

(21) Appl. No.: 13/072,471

(22) Filed: Mar. 25, 2011

(65) Prior Publication Data
US 2012/0243456 A1    Sep. 27, 2012

(51) Int. Cl.
*H04W 12/08* (2009.01)
*H04W 76/02* (2009.01)
*H04L 29/06* (2006.01)
*H04W 88/08* (2009.01)

(52) U.S. Cl.
CPC .............. *H04W 76/02* (2013.01); *H04W 12/08* (2013.01); *H04L 63/0263* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2005/0113086 A1* | 5/2005 | Wilson | 455/432.2 |
| 2008/0146230 A1* | 6/2008 | Pandian et al. | 455/436 |
| 2010/0043067 A1* | 2/2010 | Varadhan et al. | 726/13 |
| 2010/0272103 A1* | 10/2010 | Ananthanarayanan et al. | 370/390 |
| 2010/0278091 A1* | 11/2010 | Sung et al. | 370/312 |
| 2010/0325357 A1* | 12/2010 | Reddy et al. | 711/118 |
| 2011/0004913 A1* | 1/2011 | Nagarajan et al. | 726/1 |
| 2011/0162060 A1* | 6/2011 | Vijayakumar et al. | 726/13 |

* cited by examiner

*Primary Examiner* — Chirag Shah
*Assistant Examiner* — Srinivasa Reddivalam

(57) ABSTRACT

Mobility of firewall rules for clients moving among bridge AP nodes in a wireless network. APs operate in bridge mode. A wireless client C is associated with a first AP. As part of that association, the first AP establishes and maintains personal firewall rules and state for client C. When wireless client C associates with a second AP in the L2 domain, the second AP sends session request to other APs. This may be in the form of a multicast message. Optionally, the second AP may send a unicast message to the first AP indicating that client C has associated with the second AP. APs receiving the multicast session request message for client C check their tables to see if they have stored firewall or other state for client C. APs having storied firewall or other state for client C send session response messages to the second AP containing stored firewall sessions and other state for client C. When the second AP receives a session response, it sends an acknowledgement to the AP which sent the response. When the AP, such as the first AP, receives the acknowledgement, it may remove all stored state for client C. If the second AP receives session response messages for client C from multiple APs, it acknowledges each, and creates session entries and state using the oldest rules in the session response messages. Flags may be logically ORed together.

21 Claims, 1 Drawing Sheet

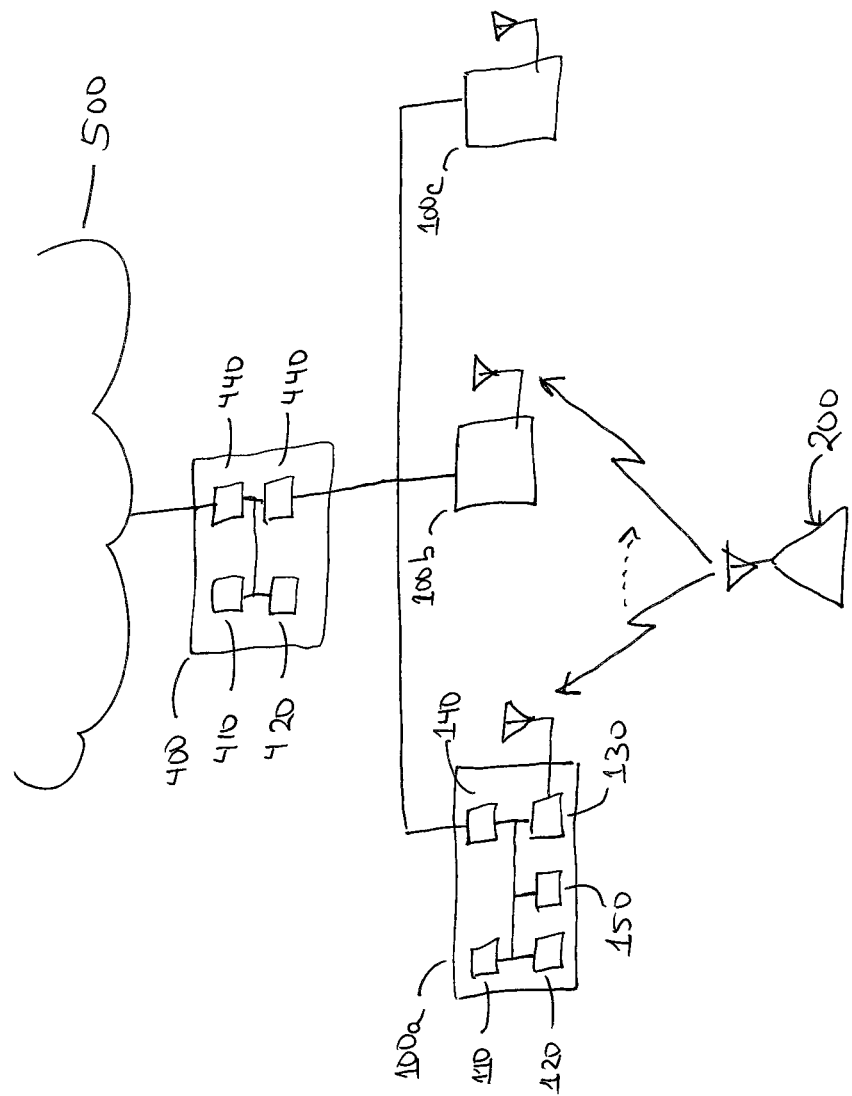

BRIDGE MODE FIREWALL MOBILITY

BACKGROUND OF THE INVENTION

The present invention relates to wireless digital networks, and in particular, to the problem of handling personal firewalls when wireless clients move from one access point to another in a wireless network.

Digital networks have rapidly become the backbone of many enterprises, small and large. The wireless aspects of these networks are becoming more and more important, as is providing seamless service to mobile wireless clients. Such wireless clients may be as simple as an individual operating a wireless handheld scanner taking inventory in a large warehouse, or may be more demanding such as a mobile Wi-Fi telephone user walking between campus buildings.

In some network configurations, it may be advantageous to have wireless access points (APs) operating in bridge mode (as compared to tunnel mode). In bridge-mode operation of a wireless SSID, the AP decrypts arriving wireless packets, converts them from 802.11 packets into 802.3 packets, and bridges those packets out on its wired interface. The AP also applies stateful firewall rules to the traffic for each wireless client, often referred to as a personal firewall.

The stateful firewall may apply a restrictive role for a bridge-client, allowing for only voip (Voice Over IP) or ftp or http traffic, and denying everything all other traffic. In advanced firewalls, sessions such as voip (such as sip/sccp) or ftp begin with the initial control packets exchanged on a well-known port. The payload within these control packets contain information of the data-port to use for the actual data transfer following the control packets. A deep-inspecting stateful firewall can look into those control packets, identify the derived ports to be used later on, and transparently create firewall sessions for these derived sessions to be allowed. This can only be done by snooping the initial control packets.

A client might connect to a different AP's SSID voluntarily due to mobility or involuntarily due to RF or other load-balancing issues. Such a client having any existing derived firewall sessions will have a session drop as the new AP does not know the specific firewall sessions to be allowed. So the call or ftp-transfer as the session might get disconnected and user will have to re-initiate such a call or transfer.

One solution to the problem is to route all client traffic back through the original AP, applying firewall rules at that original AP. This is unwise.

This problem does not exist in tunnel-mode operation of SSIDs, as all firewall enforcement happens on a shared controller, where the sessions are maintained centrally. In such controller-based architectures any amount of mobility of a client from one AP to another will not make the controller lose the session state.

What is needed is a better way of managing personal firewall rules when clients move from one bridge AP to another.

BRIEF DESCRIPTION OF THE DRAWINGS

The invention may be best understood by referring to the following description and accompanying drawings that are used to illustrate embodiments of the invention in which:

FIG. 1 shows devices in a network.

DETAILED DESCRIPTION

Embodiments of the invention relate to methods of managing mobility of firewall rules in bridge APs in a wireless network.

According to the present invention, an access point (AP) operating in bridge mode provides personal firewall rules to connected clients. When a client C connected to a first AP moves to a second AP in the same L2 domain, existing firewall rules for the client from the first AP are transferred and put in place on the second AP. When bridge client C moves from a first AP to a second AP, by associating with the second AP, the second AP sends a session request for client C to other APs on the network. This may be a multicast message. Optionally, all APs in this L2 domain use this session request to record the second AP as the new home AP for client C. The old home AP for client C, in this case the first AP, on receiving the session request for client C sends AP2 a session response with the firewall session entries and user table entries with client C. The second AP acknowledges (ACK) the response. The first AP can then delete entries for client C from its tables so that only one AP in the L2 domain has state for client C. If any other APs in the L2 domain have sessions for client C, those APs send that information as session responses to the second AP. The second AP acknowledges these messages. The APs receiving ACKs can clean up state for client C. The second AP builds firewall rules for the wireless client using received session response messages. If the second AP receives multiple messages, it uses the oldest rules. Flags may be logically ORed together.

FIG. 1 shows a network in which access points (APs) 100 are purpose-made digital devices, each containing a processor 110, memory hierarchy 120, and input-output interfaces 130. In one embodiment of the invention, a MIPS-class processor such as those from Cavium or RMI is used. Other suitable processors, such as those from Acorn, Intel, or AMD may also be used. The memory hierarchy 120 traditionally comprises fast read/write memory for holding processor data and instructions while operating, and nonvolatile memory such as EEPROM and/or Flash for storing files and system startup information. Wired interfaces 140 are typically IEEE 802.3 Ethernet interfaces, used for wired connections to other network devices such as switches, or to a controller. Wireless interfaces 130 may be WiMAX, 3G, 4G, and/or IEEE 802.11 wireless interfaces. In one embodiment of the invention, APs operate under control of a LINUX operating system, with purpose-built programs providing host controller, LD, and access point functionality. Access points 100 typically communicate with a controller 400, which is also a purpose-built digital device having a processor 410, memory hierarchy 420, and commonly a plurality of wired interfaces 440. Controller 400 provides access to network 500, which may be a private intranet or the public internet.

Wireless client device 200 has a similar architecture, chiefly differing in input/output devices; a laptop computer will usually contain a large LCD, while a handheld wireless scanner will typically have a much smaller display, but contain a laser barcode scanner.

According to the present invention, APs 100 are operated in bridge mode. APs 100*a*, 100*b*, 100*c* are preferably in the same L2 domain.

Assume wireless client 200 is associated with AP 100*a*. AP 100*a* maintains a stateful personal firewall 150 and additional state for client 200. The stateful firewall may be set up to only allow traffic on http ports, voip ports, or combinations. For advanced stateful firewalls with deep packet inspection capabilities, the firewall may be able to derive ports to be used from inspecting control packets and identifying sessions, opening necessary ports.

When client 200 associates with AP 100*b*, it is desirable to move these firewall sessions so that they do not have to be re-learned at the new AP.

According to the present invention, when client 200 associates with AP 100b, AP 100b sends session request for client 200 to other APs. In one embodiment of the invention, this is sent as a multicast message. As a multicast message, this session request will be sent to all APs in the L2 domain. It should be noted that if client 200 is associating with an AP for the first time, this multicast session request will not produce any responses.

According to the example given, with client 200 moving from AP 100a to AP 100b by associating with AP 100b, AP 100b sends out a multicast session request for client 200. AP 100a receives this multicast message and identifies client 200 as one of its clients. This may be done for example by including the MAC address of client 200 in the session request.

On receiving the session request, AP 100a recognizes client 200 as one of its clients. AP 100a sends a session response to AP 100b containing the firewall and user 0information for client 200.

Optionally, AP 100b sends a unicast message to AP 100a informing AP 100a of the new association with client 200. This unicast message may be sent prior to sending the multicast session request. AP 100b has the identity of the first AP, AP 100a, as it was identified as the home AP for client 200.

AP 100b sends an acknowledgment (ACK) for each session response received.

When AP 100a receives the ACK for its session response, AP 100a may clean out its tables, removing any state saved for client 200.

It may be the case that multiple APs have stored state for client 200. This may occur, for example, if multicast session requests are missed as client 200 associates with new APs. Assume in this caste that AP 100c has some stored state for client 200. When AP 100c receives the multicast session request for client 200 from AP 100b, it sends a session response to AP 100b with firewall and state information for client 200. This is received and acknowledged by AP 100b. AP 100c on receipt of the ACK may remove its stored state for client 200.

AP 100b creates firewall 150 rules for client 200 using the session response messages received. In the case where an AP such as AP 100b receives multiple session responses, AP 100b creates session entries using the oldest rules present. Rule flags may be ORed together.

The present invention may be realized in hardware, software, or a combination of hardware and software. A typical combination of hardware and software may be a controller or access point with a computer program that, when being loaded and executed, controls the device such that it carries out the methods described herein.

The present invention also may be embedded in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:

1. A computer-implemented method, comprising:
   receiving, at an access point, an association request, wherein the association request is related to a wireless client;
   sending, from an access point, a multicast session request for information related to the wireless client, wherein the wireless client is associated with another access point;
   receiving, at the access point, a plurality of responses, wherein the a response includes one or more firewall rules and additional information related to the wireless client, and wherein the plurality of responses are associated with a plurality of access points;
   determining, at the access point, a set of firewall rules for the wireless client, wherein the set of firewall rules are determined using the plurality of responses associated with the plurality of access points; and
   transmitting, from the access point, an acknowledgement, wherein receiving the acknowledgement causes the other access point to delete the firewall rules and the additional information related to the wireless client.

2. The computer-implemented method of claim 1, wherein the access point sends the multicast session request to multiple access points in a same Open System Interconnection (OSI) Layer 2 domain as the access point sending the multicast session request.

3. The computer-implemented method of claim 1, wherein the acknowledgement is sent to each of the multiple access points is independent of the wireless client.

4. The computer-implemented method of claim 1, wherein determining the set of firewall rules is based on determining an oldest firewall rule of multiple received responses.

5. The computer-implemented method of claim 1, wherein determining the set of firewall rules is based on a superset of firewall rules received from multiple responses.

6. The computer-implemented method of claim 1, further comprising:
   determining a single access point having a current session open with the wireless client;
   sending a unicast session request to the single access point;
   receiving a response to the unicast session request from the single access point; and
   sending an acknowledgement to the single access point, the acknowledgement causing the single access point to delete firewall rules and the information related to the wireless client.

7. The computer-implemented method of claim 6, wherein determining the single access point having a current session open with the wireless client is based on a previously-received multicast session request.

8. A system, comprising:
   one or more processors;
   one or more non-transitory computer readable storage mediums containing instructions to cause the one or more processors to perform operations including:
   receiving, at an access point, an association request, wherein the association request is related to a wireless client;
   sending, from an access point, a multicast session request for information related to the wireless client, wherein the wireless client is associated with another access point;
   receiving, at the access point, a plurality of responses, wherein the a response includes one or more firewall rules and additional information related to the wireless client, and wherein the plurality of responses are associated with a plurality of access points;

determining, at the access point, a set of firewall rules for the wireless client, wherein the set of firewall rules are determined using the plurality of responses associated with the plurality of access points; and transmitting, from the access point, an acknowledgement, wherein receiving the acknowledgement causes the other access point to delete the firewall rules and the additional information related to the wireless client.

9. The system of claim 8, wherein the access point sends the multicast session request to multiple access points in a same Open System Interconnection (OSI) Layer 2 domain as the access point sending the multicast session request.

10. The system of claim 8, wherein the acknowledgement is sent to each of the multiple access points is independent of the wireless client.

11. The system of claim 8, wherein determining the set of firewall rules is based on determining an oldest firewall rule of multiple received responses.

12. The system of claim 8, wherein determining the set of firewall rules is based on a superset of firewall rules received from multiple responses.

13. The system of claim 8, containing further instructions to cause the one or more processors to perform operations including:
determining a single access point having a current session open with the wireless client;
sending a unicast session request to the single access point;
receiving a response to the unicast session request from the single access point; and
sending an acknowledgement to the single access point, the acknowledgement causing the single access point to delete firewall rules and the information related to the wireless client.

14. The system of claim 13, wherein determining the single access point having a current session open with the wireless client is based on a previously-received multicast session request.

15. A non-transitory computer program product, tangible embodied in a non-transitory machine readable storage medium, including instructions operable to cause a data processing apparatus to:
receive, at an access point, an association request, wherein the association request is related to a wireless client;
send, from an access point, a multicast session request for information related to the wireless client, wherein the wireless client is associated with another access point;
receive, at the access point, a plurality of responses, wherein the a response includes one or more firewall rules and additional information related to the wireless client, and wherein the plurality of responses are associated with a plurality of access points;
determine, at the access point, a set of firewall rules for the wireless client, wherein the set of firewall rules are determined using the plurality of responses associated with the plurality of access points; and
transmit, from the access point, an acknowledgement, wherein receiving the acknowledgement causes the other access point to delete the firewall rules and the additional information related to the wireless client.

16. The computer program product of claim 15, wherein the access point sends the multicast session request to multiple access points in a same Open System Interconnection (OSI) Layer 2 domain as the access point sending the multicast session request.

17. The computer program product of claim 15, wherein the acknowledgement is sent to each of the multiple access points is independent of the wireless client.

18. The computer program product of claim 15, wherein determining the set of firewall rules is based on determining an oldest firewall rule of multiple received responses.

19. The computer program product of claim 15, wherein determining the set of firewall rules is based on a superset of firewall rules received from multiple responses.

20. The computer program product of claim 15, further comprising instructions operable to cause a data processing apparatus to:
determine a single access point having a current session open with the wireless client;
send a unicast session request to the single access point;
receive a response to the unicast session request from the single access point; and
send an acknowledgement to the single access point, the acknowledgement causing the single access point to delete firewall rules and the information related to the wireless client.

21. The computer program product of claim 20, wherein determining the single access point having a current session open with the wireless client is based on a previously-received multicast session request.

* * * * *

UNITED STATES PATENT AND TRADEMARK OFFICE
CERTIFICATE OF CORRECTION

PATENT NO. : 9,148,895 B2
APPLICATION NO. : 13/072471
DATED : September 29, 2015
INVENTOR(S) : Santashil PalChaudhuri et al.

It is certified that error appears in the above-identified patent and that said Letters Patent is hereby corrected as shown below:

In the Claims

In column 4, line 11, in Claim 1, delete "the a" and insert -- the --, therefor.

In column 4, line 64, in Claim 8, delete "the a" and insert -- the --, therefor.

In column 6, line 21, in Claim 15, delete "the a" and insert -- the --, therefor.

Signed and Sealed this
Twelfth Day of April, 2016

Michelle K. Lee
*Director of the United States Patent and Trademark Office*